United States Patent Office 3,336,191
Patented Aug. 15, 1967

3,336,191
ANTHELMINTIC 2-AMIDOBENZIMIDAZOLES
Paul N. Craig, Ambler, and John R. E. Hoover, Glenside, Pa., assignors to Smith Kline & French Laboratories, Philadelphia, Pa., a corporation of Pennsylvania
No Drawing. Filed Mar. 11, 1966, Ser. No. 533,457
11 Claims. (Cl. 167—53)

This application is a continuation-in-part of our copending application Ser. No. 462,080, filed June 7, 1965, now abandoned.

This invention relates to anthelmintic compositions containing 2-amidobenzimidazoles and to methods for combatting helminthiasis in animals using such compounds.

According to one aspect of the invention, there are provided an anthelmintic composition and method of producing anthelmintic activity which utilizes as the essential active ingredient certain 2-amidobenzimidazoles represented by the general formula:

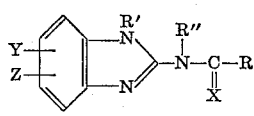

FORMULA I wherein

R is hydrogen, alkyl straight or branched containing from 1 to 10 carbon atoms, alkenyl straight or branched containing from 3 to 10 carbon atoms; alkynyl containing 3 to 10 carbon atoms; cycloalkyl including alkylcycloalkyl from 3 to 10 carbon atoms; phenyl, naphthyl; or phenyl or naphthyl substituted by lower alkyl or lower alkoxy, provided that when R is either alkenyl or alkynyl that the double or triple bond thereof is not conjugated with the C=X moiety;

R' is hydrogen, alkyl from 1 to 10 carbon atoms, or hydroxyalkyl, preferably hydrogen;

R'' is hydrogen, alkyl from 1 to 10 carbon atoms, or acyl to 10 carbon atoms, preferably hydrogen;

X is either sulfur or oxygen, preferably oxygen; and

Y and Z are hydrogen, alkyl up to 10 carbon atoms, alkoxy up to 10 carbon atoms, trifluoromethyl, amino, alkylamino, dialkylamino, cyano, acylamino, halogen, hydroxy, nitro, alkylthio, carboxy, carbalkoxy, carboxamido, alkylcarboxamido, or dialkylcarboxamido with all the alkyl substituted moieties having up to 4 carbon atoms.

It is preferred to use as the active ingredient of the novel compositions, a compound of the Formula I in which R' and R'' are hydrogen, X is oxygen, R, Y, and Z are as defined above, as shown in Formula II below:

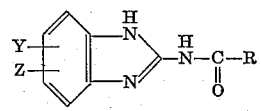

FORMULA II

The most advantageous novel compounds are that of Formula II in which R is alkyl from 2 to 10 carbon atoms, preferably from 3 to 10 carbons; or R is cycloalkyl from 3 to 10 carbon atoms, and Y and Z are hydrogen.

To the best of our knowledge, only the 2-formamido, the 2-acetamido, and the 2-benzamidobenzimidazoles have been mentioned in the literature, but no anti-infective activity of any type was attributed to them. The 2-formyl compound is reported in J. Org Chem., 23:729 (1958); the 2-acetamido in Beilstein, 24, I 240; and the 2-benzamido compound in J. Chem. Soc., 1960; pp. 2369–70.

Examples of specific compounds falling within Formula I are:

2-formamidobenzimidazole (N-(2-benzimidazolyl) formamide)
2-acetamidobenzimidazole
2-propionamidobenzimidazole
2-thiopropionamidobenzimidazole
2-butyramidobenzimidazole
2-isobutyramidobenzimidazole
2-thioisobutyramidobenzimidazole
2-valeramidobenzimidazole
2-thiovaleramidobenzimidazole
2-isovaleramidobenzimidazole
2-pivalamidobenzimidazole
2-caproamidobenzimidazole
2-caprylamidobenzimidazole
2-ethylcaproamidobenzimidazole
2-benzamidobenzimidazole
2-phenylacetamidobenzimidazole
2-acetamido-1-methylbenzimidazole
2-cyclopropanecarboxamidobenzimidazole
2-cyclobutanecarboxamidobenzimidazole
2-cyclohexanecarboxamidobenzimidazole
2(1-methylcyclopropanecarboxamido)benzimidazole
2-(methylbutyramido)benzimidazole
2-isobutyramido-5-methylbenzimidazole
2-isobutyramido-4-methylbenzimidazole
2-isobutyramido-5-n-butylbenzimidazole
2-isobutyramido-5-nitrobenzimidazole
5-chloro-2-isobutyramidobenzimidazole
2-cyclopropanecarboxamido-5(6)-methoxybenzimidazole
5(6)-bromo-2-propionamidobenzimidazole
5(6)amino-2-isobutyramidobenzimidazole
2-cyclopropanecarboxamido-5(6)-dimethylamino-benzimidazole
5(6)-carboxy-2-propionamidobenzimidazole
5(6)-carbethoxy-2-isobutyramidobenzimidazole
5(6)-carboxyamido-2-cyclopropylcarboxamido-benzimidazole
5(6)-nitro-2-propionamidobenzimidazole
5(6)-cyano-2-isobutyramidobenzimidazole
2-cyclopropanecarboxamido-4(7)-nitrobenzimidazole
2-cyclopropanecarboxamido-4(7)-trifluoromethyl-benzimidazole
2-cyclopropanecarboxamido-4(7)-hydroxybenzimidazole
4(7)-amino-2-isobutyramidobenzimidazole
1,5-dimethyl-2-cyclopropanecarboxyamidobenzimidazole
2(N-methylacetamido)benzimidazole
2-(N,N-diacetylamino)-1-methylbenzimidazole
2(3-butenamido)benzimidazole
2(3-butynamido)benzimidazole
2(3-pentenamido)benzimidazole
2(3-pentynamido)benzimidazole
5(6)-methylthio-2-cyclopropylamidobenzimidazole
5(6)-(N-methylcarboxamido)-2-propionamido-benzimidazole
5(6)-(N,N-dimethylcarboxamido)-2-isobutyramido-benzimidazole It will be readily apparent to one skilled in this art that certain of the substituted 2-aminobenzimidazole compounds (R is branched) of this invention may have asymmetric carbon atoms, forming optically active d- and l-compounds. The connotation of the general formulas presented herein is intended to include the separated d- or l-optical isomers, as well as racemic mixtures of these isomers.

If desired, the isomers may be separated for individual use by resolution methods known to the art, such as fractional crystallization of the l-tartrate salts of the diamines. Alternatively, a synthesis starting with an optically active side chain may yield the desired optical isomer.

The compounds of Formula I being weak bases will normally form salts with strong acids, both inorganic and organic. In addition, these compounds which are unsubstituted in the 1-position (R'=hydrogen), are weak acids, and will normally form salts with strong inorganic bases. Accordingly, the nontoxic salts formed with pharmaceutically acceptable strong inorganic acids and bases, and strong organic acids may be alternatively employed in the compositions of the invention. Other nontoxic molecular complexes known to exist that can be derived from compounds of Formula I may also be used in this invention, since the anthelmintic activity rests in the 2-acylaminobenzimidazole structure itself.

The compounds of Formula I or II in which R is alkyl and X is oxygen are prepared by reacting 2-aminobenzimidazoles in pyridine, or other organic solvent, with the appropriate acyl halide to give the corresponding 2-amidobenzimidazole. The acylation is usually carried out in an ice bath and the desired product is isolated and purified by recrystallization from suitable solvents, as described below.

The compounds of Formula I or II in which R is alkenyl or alkynyl are prepared in like manner to the above, by using acyl halides in which the double or triple bond thereof, respectively, is not conjugated with the C=X or C=O moiety.

The amides of Formula I, especially when Y and Z are other than hydrogen, are conveniently prepared by starting with cyanamide, and reacting it with a selected acyl halide in pyridine, or other organic solvent, followed by reaction with an appropriately substituted o-phenylenediamine, to give the corresponding benzene ring-substituted 2-amidobenzimidazole.

In the case of the compounds of Formula I in which X is sulfur, these may advantageously be prepared by the same general procedure, reacting the prepared 2-acylaminobenzimidazole with phosphorous pentasulfide in a suitable medium to give the analogous 2-thioacylaminobenzimidazole.

The compounds of Formula I where R and R" are alkyl, and R' is hydrogen, are prepared by treating o-phenylenediamine with an alkyl isothiocyanate to form the corresponding adduct. The adduct is cyclized to form 2-alkylaminobenzimidazole, which is treated with an acyl halide to yield a 2-(N-alkyl)acylamidobenzimidazole.

The compounds of Formula I wherein R and R' are alkyl, and R" is acyl, are prepared by treating a suitable 1-alkyl-2-aminobenzimidazole with an acyl anhydride such as acetic anhydride, to give the corresponding 1-alkyl-2-diacylaminobenzimidazole.

The 2-amidobenzimidazoles, and their thio analogues of Formula I, have been found to possess useful anthelmintic properties, that is, broad spectrum activity against parasites of warm blooded animals, including both mature and immature parasitic forms. In particular, these compounds have been found to exhibit high activity against various helmintic infections of the intestinal tract of economically important animals, coupled with low systemic toxicity to the host animal.

For example, the disclosed compounds are generally effective in clearing mice of worm infections for laboratory purposes, among others: *Syphacia obvelata* and *Aspicularis tetraptera* (mouse pinworm), *Nematospiroides dubius* (mouse hookworm), and the migratory stages of *Ascarius suum*.

Other susceptible helminths include *Trichuris vulpis* (whipworm) found in naturally infested dogs. Also, parasitic to this host are *Ancylostoma caninum, Toxocara canis,* and Physalaptera spp.

Compounds of Formula I have been demonstrated as efficacious against parasites of pigs, such as the migratory stages of *Ascaris suum*, thus preventing the development of verminous pneumonia.

Compounds of Formula I have also been demonstrated as efficacious against parasitic gastroenteritis in sheep, such as *Haemonchus contortus*, Ostertagia spp., Trichostrongylus spp., Nematodirus spp., *Trichuris ovis,* Cooperia spp., and *Strongyloides papillosus. Bunostomum trigonocephalum* and Oesophagostomum spp., are other important parasites of sheep.

The amount of ingredient administered will depend on the weight of the host, but will usually be between about 5 mg./kg. and 500 mg./kg. of body weight daily.

For example, 2-isobutyramidobenzimidazole at an oral daily dose of 50 mg./kg. tested in clearing mice of natural pinworm infection, following generally the method of McCowen et al., reported in the American Journal of Tropical Medicine, 6, 894 (1957), gives a 96% result in terms of worms cleared; while at 250 mg./kg. dose it gives 98%. Its $LD_{50}$ in mice is in excess of 1 g./kg.

Additionally, exemplary compounds of this invention, given at varying daily dosages of 0.0125, 0.05 and 0.20% of the mouse diet for 5 days, tested against mouse hookworm (*N. dubius*) infection (0.2% of diet approximates 100 mg./kg. of body weight, based on 20 g. mouse) gave the results indicated in the tabulation.

| Compound | Percent of Diet | Percent Reduction of Hookworm Burden |
|---|---|---|
| 2-benzamidobenzimidazole | 0.05 | 98 |
|  | 0.20 | 100 |
| 2-propionamidobenzimidazole | 0.0125 | 10 |
|  | 0.05 | ¹ 50 |
|  | 0.20 | 78 |
| 2-butyramidobenzimidazole | 0.05 | 0 |
|  | 0.20 | 80 |
| 2-isobutyramidobenzimidazole | 0.0125 | 11 |
|  | 0.05 | ¹ 71 |
|  | 0.20 | 910 |
| 2-cyclopropaneamidobenzimidazole | 0.05 | 88 |
|  | 0.20 | ¹ 100 |
| 2-isobutyramido-4-methylbenzimidazole | 0.05 | 85 |
|  | 0.20 | 100 |

¹ Figure is average of two experiments.

Typical daily dosage in dogs runs from about 25–250 mg./kg., given orally.

In four-week old pigs, artificially infested with *Ascaris suum* larvae, 2-isobutyramidobenzimidazole was effective in markedly reducing the mean larval count per lung. Three medicated pigs had an average mean of 23,250 as compared to 172,700 for the three pigs which were infected, but unmedicated. Drug administration medicated diets were employed containing 0.1% of drug in the diet.

In lambs, naturally infested with various gastrointestinal nematodes, compounds of Formula I were each tested at the dosages indicated below, expressed in mg./kg. of body weight, in a single dose of 10% concentration in water, with the striking results given in the tabulation below:

| Compound | Untreated Total Nematodes ¹ | Treated, Percent Reduction |
|---|---|---|
| 2-isobutyramidobenzimidazole (50 mg.) | 6,205 | 73.2 |
| 2-butyramidobenzimidazole (50 mg.) | 6,845 | 97.83 |
| 2-propionamidobenzimidazole (25 mg.) | 1,695 | 97.3 |
| 2-benzamidobenzimidazole (50 mg.) | 4,470 | 94.9 |
| 2-cyclopropaneamidobenzimidazole (25 mg.) | 5,185 | 98.9 |
| 2-cyclobutaneamidobenzimidazole (25 mg.) | 5,640 | 95.6 |

¹ Eggs per gram feces. Mean, 4 sheep.

Identification of helminths by examination of the feces of the lambs, both pre- and post-treatment, in terms of eggs per gram, and also by examination of the gastrointestinal tract at autopsy, verified that the tabulated compounds were active against most, if not all, the sheep helminths enumerated previously.

For certain veterinary uses, the compounds of Formula I may be made up in the form of an animal food concentrate or feed supplement; or in the compounds per se, may be added to an animal foodstuff for ingestion by the host animal. Also, these compounds may be administered in lower doses prophylactically usually in the animal's feed in order to keep worm infestations under control.

As previously mentioned, the compounds of Formula I have general anthelmintic activity and accordingly a further and most important aspect of this invention provides a method of treating helmintic infections in an animal which comprises administering, usually orally, to the animal in a sufficient nontoxic, but effective, dose an anthelmintic compound falling within the definition of Formula I, generally in the form of a pharmaceutical or veterinary composition as hereinbefore described. The daily dose range commonly used is from about 5 mg./kg. to about 500 mg./kg. depending on the species of host and regimen used. One dose per day administrations is preferred but up to five of the dosage units described above may be used if desired.

In practice, a pharmacologically active compound of structural Formula I is usually formulated with a nontoxic carrier to give anthelmintic compositions of this invention. The carrier may be an orally ingestible container for the active ingredient, for example, a hard or soft gelatin capsule, or it may be a pharmaceutically acceptable diluent or excipient of the kind normally used in the production of medicaments, ready for use, for example maize starch, terra alba, lactose, sucrose, calcium phosphate, gelatin, talcum, stearic acid, magnesium stearate, dextrin, agar, pectin, or acacia (gum arabic).

Exemplary of liquid carriers are peanut oil, olive oil, sesame oil, and water. Similarly, the carrier or diluent may include a time delay material such as glyceryl monostearate or glyceryl distearate alone or with a wax.

A wide variety of pharmaceutical forms can be employed. Thus, if a solid carrier is used, the preparation can be tableted, placed in a hard gelatin capsule. The amount of solid carrier will vary widely but preferably will be from about 25 mg. to about 3 gm. If a liquid carrier is used, the preparation may be in the form of a soft gelatin capsule, placed in an ampul or in liquid suspension.

The compositions are most often made up in a form suitable for internal administration and may therefore take the form of a liquid drench, for example, an emulsion or a sterile solution or suspension in water, oil, such as arachis oil, or other liquid.

The compositions are advantageously made up in a dosage unit form adapted for the desired mode of administration, the dosage unit may take the form of a suspension, tablet, packaged powder, bolus, or encapsulated powder. The quantity of active ingredient in each dosage unit will be such that one or more units are required for each therapeutic administration.

Animals of low weight will be treated with unit doses ranging no higher than a few milligrams; whereas animals of high body weight, such as ruminants, will require proportionally large unit doses ranging up to several grams. Preferably, a single dose is administered daily for each animal species based on the average weight of that species.

Where tableting is used, the resulting tablets are then coated with methyl methacrylate to form an enteric coating, i.e. a coating which is substantially insoluble in gastric secretion but substantially soluble in intestinal fluids.

It will be appreciated that the active ingredient used in the formation of the tablets described above may be replaced with other compounds of Formula I having the necessary anthelmintic activity. Furthermore, other materials may be used to form the enteric coating, for example, other synthetic plastic materials such as methyl acrylate, cellulose derivatives, hydrogenated castor oil or phthalates.

The compositions prepared as just described are administered, usually orally, to an infected host from 1-5 times daily for anthelmintic activity.

The following examples illustrate a synthesis which may be employed in formulating the compositions of the invention but are not considered limiting the invention described herebefore.

*Example 1.—Preparation of 2-propionamidobenzimidazole*

Ten grams of 2-aminobenzimidazole are added to 60 ml. of pyridine and the mixture is held at 0–4 C., stirring and 6.95 g. of propionyl chloride are added slowly. The reaction mixture is stirred for 10 minutes in an ice bath and allowed to stand at room temperature for one hour, followed by heating on a steam bath an additional hour. The reaction mixture is cooled and poured into approximately 3 volumes of water. The white crystalline solid which forms is collected, washed with water and oven-dried, yielding 4.8 g. of crude product, M.P. 254.5–255.5° C.

The product is recrystallized twice from ethanol to give colorless crystals, M.P. 257–258.5° C. The structure of the desired product is confirmed by elemental analyses and by IR and NMR spectral data.

*Example 2.—Preparation of 2-isobutyramidobenzimidazole*

Using the procedure detailed in Example 1, 10 g. of 2-aminobenzimidazole and 8 g. of isobutyryl chloride are reacted to give 12.4 g. of crude product, M.P. 242–243.5° C.

Two recrystallizations from ethanol give the desired product, M.P. 243–244° C., whose structure is confirmed by elemental analyses, IR and NMR spectral data.

*Example 3.—Preparation of 2-butyramidobenzimidazole*

Using the procedure described in Example 1, 10 g. of 2-aminobenzimidazole, and 8 g. of butyryl chloride are reacted yielding 11.45 g. of product, M.P. 250–252° C., whose structure is confirmed by analytical and spectral data.

*Example 4.—Preparation of 2-valeramidobenzimidazole*

Using the procedure described in the previous examples, 10 g. of 2-aminobenzimidazole and 9 g. of valeryl chloride are reacted to give 8.25 g. of a crude product, M.P. 203–209° C.

The crude product is recrystallized twice from n-propanol. The pure product (4.7 g., M.P. 215–216° C.) is dried under high vacuum over $P_2O_5$ and submitted for elemental analyses, and for IR and NMR spectra. The identity of the product is confirmed by these analytical results.

*Example 5.—Preparation of 2-isovaleramidobenzimidazole*

Using the procedure described above, 10 g. of 2-aminobenzimidazole and 9 g. of isovaleryl chloride are reacted to yield 12.1 g. of a crude product, M.P. 248.5–252° C.

The crude product is twice recrystallized, from n-propanol, in a manner similar to that previously described in Example 4, yielding 5.9 g. of a purified product, M.P. 253–254.5° C. The identity of the product is confirmed by the elemental analyses, IR and NMR results.

*Example 6.—Preparation of 2-pivalamidobenzimidazole*

Using the procedure of Examples 4 and 5, a mixture of 5.32 g. of 2-aminobenzimidazole and 4.8 g. of pivalyl chloride are reacted, washed with cold water, and oven-dried on a porous plate, yielding 4.7 g. of a crude product, M.P. 255–256.5° C.

The crude product is twice recrystallized from n-propanol. The purified product is dried as in Example 4, and submitted for elemental analyses and for IR and NMR spectra. The structure of the purified product (1.7 g., M.P. 255–256.5° C.) is confirmed by the analytical and spectral data.

*Example 7.—Preparation of 2-hexanamidobenzimidazole*

Using the procedure of the preceding example, 10 g. of 2-aminobenzimidazole and 10 g. of hexanoyl chloride are reacted, yielding 13.26 g. of a crude yellow product, M.P. 219–223° C.

Six g. of the crude product is twice recrystallized from n-propanol. It is dried under high vacuum over $P_2O_5$, and submitted for elemental analyses and for IR and NMR spectra. That this material is the desired product (4.3 g., M.P. 225–226° C.) is confirmed by the analytical results.

*Example 8.—Preparation of 2-heptanamidobenzimidazole*

Using the procedure of the preceding examples, 10 g. of 2-aminobenzimidazole and 11.1 g. of n-heptanoyl chloride are reacted to give 15.06 g. of a crude product, M.P. 204–207° C.

The crude product is twice recrystallized from n-propanol. The purified product is dried in vacuo over $P_2O_5$, and submitted for elemental analysis, and for IR and NMR spectra. The identity of the product (9.52 g., M.P. 214–215.5° C.) is confirmed by the analytical results.

*Example 9.—Preparation of 2-thioisobutyramidobenzimidazole*

2-isobutyramidobenzimidazole (20.39 g.) prepared as disclosed in Example 2 above, is mixed with 200 ml. of dry dioxane. Phosphorous pentasulfide (11.19 g.) are added, and the mixture is refluxed for one hour. The reaction mixture is poured into water, and neutralized, to precipitate the desired thio analogue of the starting material.

*Example 10.—Typical cattle bolus containing an anthelmintic described herein*

| | Grams |
|---|---|
| 2-isobutyramidobenzimidazole | 2.0 |
| Calcium phosphate | 2.5 |
| Maize starch | 0.54 |
| Talcum | 0.14 |
| Gum arabic | 0.15 |
| Magnesium stearate | 0.05 |

The calcium phosphate and the anthelmintic compound are thoroughly mixed, and the mixture reduced to a particle size finer than 60 mesh. About one-half of the starch is added, as an aqueous paste, and the resulting mixture granulated. The granules are passed through a #10 mesh screen and dried at 110–130° F. for about 8 hours. The dried materials then passed through a #16 mesh screen. The guar gum and the balance of the starch are added and the mixture thoroughly blended. Finally, the remainder of the ingredients are added and the entire mass thoroughly mixed and compressed into a bolus. The magnesium stearate, talcum and gum acacia are of a particle size to pass a #10 mesh screen.

*Example 11—Typical sheep drench containing an anthelmintic described herein*

| | Parts by weight |
|---|---|
| 2-acetamidobenzimidazole | 60 |
| Terra Alba English | 35.5 |
| Tragacanth, U.S.P. | 3.0 |
| Sodium Lauryl Sulfate | 1.5 |
| Water. | |

The above solid components are thoroughly mixed, giving a water dispersable powder. This powder can be directly admixed with water in concentrations on the order of 5 g. of powder and 5 cc. of water.

*Example 12.—Preparation of 1-methyl-2-acetamidobenzimidazole*

Five g. of 1-methyl-2-aminobenzimidazole is mixed with 18 ml. of acetic anhydride and held at 0–4° C., and stirred for a total of 40 min. 20 ml. of water is added to the white solid which forms, dissolving the solid and leaving a brown solution to which is added ammonium hydroxide. Upon reaching a pH of 8, a white solid precipitates and is collected, yielding 3.25 g. of crude dried product, M.P. 179–181° C.

The product is recrystallized twice from 50% ethanol while heating, then hood-dried to give a dry weight of 1.67 g., M.P. 181–183° C. The structure of the desired product is confirmed by IR spectral data.

*Example 13.—Preparation of 2-cyclobutanecarboxamidobenzimidazole*

5.6 g. of 2-aminobenzimidazole is added to 34 ml. of pyridine and the mixture is held at 0–4° C., with 5.0 g. of cyclobutanecarboxylic acid chloride being added slowly with stirring. The mixture is then stirred at room temperature for one hour during which time a cansiderable amount of solid forms in the reaction solution. The mixture is poured into 5 vols. of water to precipitate a white solid, which is collected by filtration and air-dried, yielding 7.55 g. of crude product, M.P. 268–269.5° C.

The roduct is recrystallized twice from methanol, yielding 3.36 g. of purified product, M.P. 268.5–269.5° C. The structure of the desired product is confirmed by elemental analyses, and IR and NMR spectral data.

*Example 14.—Preparation of 2-cyclopropanecarboxamidobenzimidazole*

Using the procedure detailed in Example 13, 10 g. of 2-aminobenzimidazole and 7.84 g. of cyclopropanecarboxylic acid chloride are reacted in 60 ml. of pyridine to give 11.44 g. of crude product, M.P. 288–291° C. Two recrystallizations from n-propanol will give the desired product (M.P. 290–291.5° C.), the structure of which is confirmed by elemental analyses, IR and NMR spectral data.

*Example 15.—Preparation of 2-isobutyramido-4-methylbenzimidazole*

Ten g. of 3-methyl-o-phenylenediamine, 8.7 g. of isobutyryl chloride, and 3.44 g. of cyanamide are reacted in the following manner: the cyanamide is dissolved in 69 ml. of pyridine and the mixture is held at 0–4° C.; while stirring, the isobutyryl chloride is added in portions giving a solution of a blood-red color. The reaction mixture is maintained at 0–4° C. for 15 min. during which time some solid appears, followed by further storing at room temperature which causes the solid to dissolve.

10 g. of 3-methyl-o-phenylenediamine is added to the reaction mixture and the resulting dark mixture is kept at room temperature for a few hours, and then heated on a steam bath for about 2.5 hrs.

After cooling to room temperature, the mixture is evaporated to give a heavy dark red oil which contains a small amount of solid. The reaction mixture is triturated with 100 ml. of 50% water-50% ethanol to give a crystalline solid. The solid is filtered off, washed with cold 1:1 $H_2O$/ethanol sparingly to give an almost white solid, which is dried in air.

This solid is suspended with stirring in 125 cc. of 1:1 water/ethanol, and treated with 5% sodium hydroxide until it gives an almost clear pale brown solution, which is filtered to give a clear pale brown solution. The solution is cautiously treated with glacial acetic acid until the mixture reaches a pH 6.5–7.0. The white solid which appears is filtered off, after cooling to about 20° C., is washed with some cold 1:1 water/ethanol, and dried on a porous plate, yielding 6.26 g. of crude product.

The crude product is twice recrystallized from an 2:3 ethanol/water mixture giving crystalline platelets (M.P. 140–143° C.). The platelets are twice recrystallized from acetonitrile then dried in a desiccator yielding 4.3 g. of white crystalline solid (M.P. 142–144° C.). The structure of the desired product is confirmed by elemental analysis and by IR and NMR spectral data.

Example 16.—Preparation of 5-chloro-2-isobutyramido-benzimidazole

Using the procedure detailed in Example 15, 13.58 g. of 4-chloro-o-phenylenediamine, 10.14 g. of isobutyryl chloride and 4 g. of cyanamide are reacted to give 10.17 g. of crude product (brown powder) M.P. 228–231° C.

Two recrystallizations, first from 90% ethanol and then from absolute ethanol, desiccated to yield 2.69 g. of pure product, M.P. 232–233.5° C. The structure of the desired product is confirmed by elemental analyses, and IR and NMR spectral data.

Example 17.—Preparation of 5-n-butyl-2-isobutyramido-benzimidazole

The procedure detailed in Example 15, 16.23 g. of 4-n-butyl-o-phenylenediamine dihydrochloride (first converting to give 12.2 g. of the free amine), 7.88 g. of isobutyryl chloride and 3.11 g. of cyanamide were reacted to yield 6.31 g. of crude product, M.P. 125–128° C. The crude product is dissolved in 50 ml. of 2-B ethanol during heating on a steam bath. Solution is filtered and water is slowly added until a slight opalescence is present, followed by crystallization with increasing water addition. The crystals are cooled, washed and air-dried, yielding 4.3 g. of the desired product (M.P. 128–133° C.), whose structure is confirmed by elemental analyses, IR and NMR spectral data.

Example 18.—Preparation of 2-benzamidobenzimidazole

Ten g. of 2-aminobenzimidazole are dissolved in 60 ml. of pyridine and the mixture is cooled in ice. While 8.78 ml. of benzoyl chloride is added slowly with stirring. The reaction mixture is stirred at room temperature for 30 minutes. The reaction mixture is added to five times its own weight of water (about 300 ml.) and the solid which forms is filtered off, water washed, and oven-dried overnight, yielding crude product, M.P. 195–198° C.

The crude product is recrystallized twice from ethanol and oven-dried to give 5.53 g. of crystals, M.P. 237.5–239° C. The structure of the desired product is confirmed by IR and NMR spectral data.

Example 19.—Preparation of 2-(2-ethylcaproamido)-benzimidazole

Ten g. of 2-aminobenzimidazole and 12.1 g. of 2-ethylhexanoyl chloride are reacted in the following manner. To a solution of the 2-aminobenzimidazole in 60 cc. of dried pyridine is added the acid chloride while cooling the pyridine solution at 10° C. The mixture is stirred at 0° C. for 20 min. then at room temperature for 40 min. It is then poured into 500 ml. of water giving an oil which is extracted three times with 200 cc. of benzene. The combined benzene extracts are washed with several portions of water. The benzene solution is evaporated to an oil, which oil is dissolved in acetonitrile, then etheral HCl is added until the solution is red to litmus paper. Scratching the vessel initiates crystallization. The crystals are cooled, filtered off, washed with cold acetonitrile and dried. The solid is placed in 100 cc. of 2-B ethanol followed by the addition of sufficient water to cause re-solution. The solution is filtered during which a solid crystallizes out. The solid is cooled, filtered off, and dried, yielding the HCl salt of the desired product (10.7 g.), M.P. 183–186.5° C.

The free amine is obtained by placing the hydrochloride salt in 2-B alcohol and then adding aqueous ammonia until slightly alkaline. The free base slowly becomes crystalline from the initial gum that forms. Solid is filtered off and dried. Part is recrystallized again from 2-B ethanol, yielding 6.7 g.

This later product is recrystallized from acetonitrile with white crystals forming slowly from the solution. The crystals are filtered off, washed with cold fresh acetonitrile, and desiccated, yielding 5.1 g. of product, M.P. 125–129° C. The final product is submitted for elemental, NMR and thin-layer chromatography analyses.

Example 20.—Preparation of 2-(N-methylacetamido)-benzimidazole

Step I.—75.6 g. (0.7 mols) o-phenylenediamine is dissolved in 500 ml. of ethyl acetate at 65–70° C. Some dark insoluble material is filtered off. The solution is stirred at 60° C. and 51 g. (47.7 ml.=0.7 mols) of methyl isothiocyanate is added in portions. After about ¾ of the isothiocyanate is added, the temperature rises rapidly to reflux. The rest of the $CH_3NCS$ is added very slowly and the mixture is kept at 75–80° C. for 15 minutes. It is then seeded and chilled. A cream colored thiourea product is collected, washed with ethyl acetate, and air dried, to yield 87 g., M.P. 140° C. with dec. and solidification.

Step II.—60 g. of yellow mercuric oxide is stirred in 300 ml. of 2-B ethanol at 65° C. The thiourea is added in portions, fairly quickly. The HgO darkens and the temperature rises to 73° C. The mixture is stirred at 73° C. for 10 minutes. A small portion is taken out, the HgS is spun down in a centrifuge, and the supernatant is warmed with fresh HgO, which again gets dark. Therefore, the solids are filtered off from the entire reaction mixture and an additional 30 g. of HgO is added. The mixture is stirred at 50–60° C. for 15 minutes. This time a test portion does not darken fresh HgO. The Hg salts are filtered off, and the ethanol is evaporated in vacuo. The resulting solid is dissolved in 100 ml. $H_2O$ and dilute HCl. Some insoluble material remained and the solution is cloudy. Darco charcoal is added and the mixture is filtered. The clear red solution is adjusted to a pH 8–9, with aqueous $NH_3$. The solution turns yellow and a heavy precipitate forms after cooling. The solid (2-methylaminobenzimidazole) is collected, washed with cold $H_2O$, and air dried, yielding 9 g., M.P. 188–191° C.

An analytical sample is recrystallized from $CH_3CN$ to constant M.P. of 190–192° C.

Step III.—1.5 g. (.01 mole) of 2-methylaminobenzimidazole is dissolved in about 10 ml. dry pyridine. The solution is cooled in an ice bath and 0.55 g.

(0.5 ml.=0.007 mole)

of acetylchloride is added in 2 portions. After about one minute, white solid appears. The mixture is refluxed for 4 hours. Orange clear solution is cooled slightly, and pyridine evaporates. 40 ml. $H_2O$ is added and a white solid product collected, washed with water and dried on a porous plate, yielding 0.9 g., M.P. 178–181° C.

The product is completely soluble in aqueous alkali and can be reprecipitated to the addition of acetic acid to pH of 7.5. The analytical sample is recrystallized from ethanol/$H_2O$., M.P. 179–181° C.

Example 21.—Preparation of 2-(N,N-diacetylamino)-1-methylbenzimidazole)

Five g. of 1-methyl-2-aminobenzimidazole (J. Med. Chem., 6, p. 601, 1963), and 18 ml. of acetic anhydride are mixed together at 0° C. for 5 minutes. The resulting brown solution is heated on a steam bath for 2 hours. To this reaction solution is added 5 vols. of water (90 ml.) which precipitates a white solid. After standing at 0–4° C. for about 15 min., the solid is cooled and washed with water, yielding 6.7 g. (wet) of a crude product, M.P. 144–146° C. The dry weight is 3.84 g.

Two recrystallizations from cyclohexane (using 354 ml. and 320 ml. thereof, respectively, are carried out, and the product is left in a desiccator to dry overnight. There follows drying at room temperature in vacuo, which yields 2.74 g. of pure product, M.P. 144–146° C. The structure of the desired product is confirmed by IR spectral data and paper chromatography.

Example 22.—Preparation of 2-isobutyramido-5-nitrobenzimidazole 14.57 g. of 4-nitro-o-phenylenediamine, 5.06 g. of isobutyryl chloride, and 2 g. of cyanamide are reacted in the following manner: The cyanamide is dissolved in 40 ml. of pyridine and the mixture is held at 0–4° C., while stirring. The isobutyryl chloride is added giving a solution of a dark reddish color, concurrently with the formation of a solid. The reaction mixture is maintained at 0–4° C. for 15 min., then at room temperature for 35 min., during which time all of the solid dissolves, leaving a dark reddish solution.

The 4-nitro-o-phenylenediamine is added to the reaction mixture at room temperature over a 35 min. period. The resulting reaction mixture is heated on a steam bath for about 2½ hrs., followed by the addition of 40 ml. of water causing the formation (upon scratching) of a red solid. This solid is collected, and is found not to contain an alkali soluble fraction.

The filtrate from the above crop is evaporated to dryness (red solid), and is suspended in 50 ml. of 50% aqueous ethanol. Then 25 ml. of 2.5 N sodium hydroxide is added and manually shaken for several minutes. After filtration, the filtrate is neutralized with glacial acetic acid whereupon a yellow-brown solid precipitates, which is oily at first, but solidifies upon scratching. This alkali soluble fraction is collected and washed with aqueous ethanol and oven dried on a porous plate, yielding 5.03 g. of a yellowish brown crude product.

The product is suspended in 35 ml. of 50% aqueous ethanol. 10% NaOH is added, with the insoluble material being filtered off. The filtrate is neutralized to precipitate a yellow-brown solid, which is oven-dried on a porous plate, yielding 3 g. of product, M.P. 224.5–227° C.

The product is recrystallized from 2–B ethanol (65 ml.) and is charcoaled. It is cooled, collected, rinsed, and oven-dried overnight. A light yellow dried solid is again recrystallized from about 50 ml. of absolute ethanol, and is desiccated, yielding 0.354 g. of pure product, M.P. 227–230° C. The structure of the desired product is confirmed by elemental analyses and by IR and NMR spectral data.

*Example 23.—Preparation of 2-cyclopropanecarboxamido-5-trifluoromethylbenzimidazole*

22 g. of 4-trifluoromethyl-o-phenylenediamine, 13.1 g. of cyclopropane carboxylic acid chloride, and 5.2 g. of cyanamide are reacted in the following manner: The cyanamide is dissolved in 100 ml. of pyridine and the mixture is cooled with stirring. The acid chloride is added, portion-wise, with stirring, maintaining the solution cold. After several additions, a solid forms having a yellow color. It is stirred at 0–4° C. for about 10 minutes, and then at room temperature for 1 hour, with the color going to dark brown.

The diamine is added, portion-wise, causing a slightly exothermic reaction. The reaction mixture is stirred at room temperature for about 30 min., then on a steam bath for about 2½ hrs.

To the resulting dark solution, having orange solid in it, about 200 ml. of water is added slowly, with the orange solid dissolving and a new solid precipitating, which is stirred for about 30 min. and cooled. The precipitate is collected and washed with water and the solid is dried on a porous plate, yielding 11.5 g. crude product, M.P. 243–247° C. The product is recrystallized from about 450 ml. ethanol plus 350 ml. water, and is cooled overnight.

The precipitate is collected and washed with about 2:1 ratio of water to ethanol, giving 8.9 g., M. P. 249–252° C.

Another recrystallization did not raise the M.P. of a small sample. The structure of the desired product is confirmed by elemental analyses and by IR and NMR spectral data.

*Example 24*

When the following substituted o-phenylenediamine are substituted for the 4-trifluoromethyl-o-phenylenediamine in the procedure of Example 23, the corresponding listed products are obtained.

| Starting Material | Product |
|---|---|
| 4-methylthio-o-phenylenediamine. | 2-cyclopropanecarboxamido-5(6)-methylthiobenzimidazole. |
| 4-hydroxy-o-phenylenediamine. | 2-cyclopropanecarboxamido-5(6)-hydroxybenzimidazole. |
| 4-carboxy-o-phenylenediamine. | 5(6)-carboxy-2-cyclopropanecarboxamidobenzimidazole [a],[b]. |
| 4-methoxy-o-phenylenediamine. | 2-cyclopropanecarboxamido-5(6)-methoxybenzimidazole. |
| 4-[N-methylcarboxamido]-o-phenylenediamine. | Cyclopropanecarboxamido-5(6)-[methylcarboxamido]-benzimidazole. |
| 4-[N-dimethylcarboxamido]-o-phenylenediamine. | 2-cyclopropanecarboxamido-5(6)-[dimethylcarboxamido]-benzimidazole. |
| 4-cyano-o-phenylenediamine. | 5(6)-cyano-2-cyclopropanecarboxamidobenzimidazole. |

[a] After heating on the steam bath, evaporation of pyridine, aqueous alcohol is added, the reaction mixture is brought to a pH of about 4 with dilute HCl to initiate precipitation of the crude product.
[b] The alkali treatment of Example 15 is omitted.

*Example 25*

When the following substituted benzoyl or naphthoyl halides are substituted for benzoyl chloride in the procedure of Example 18, the corresponding listed products are obtained:

| Starting material | Product |
|---|---|
| o-Methoxybenzoyl chloride | 2-(o-methoxybenzamido)-benzimidazole. |
| p-Ethylbenzoyl chloride | 2-(p-ethylbenzamido)-benzimidazole. |
| Naphthoyl chloride | 2(1-naphthoylamina)-benzimidazole. |

*Example 26.—Preparation of methyl-2-cyclopropaneamidobenzimidazole-5-carboxylate*

To a cooled, stirred solution of cyanamide (5.25 g., 0.125 mole) in dry pyridine (100 ml.), cyclopropanecarboxylic acid chloride (13.1 g., 0.125 mole) is added portionwise. The mixture is stirred at ice bath temperature for 10 min. then at room temperature for 1 hr. Methyl-3,4-diaminobenzoate (20.8 g., 0.125 mole) is added in portions, the resulting mixture being stirred at room temperature one-half hr., and then is allowed to stand overnight at room temperature. The mixture is diluted with 200 ml. of water and the precipitate is collected and air dried to give a fair yield of the desired product. Purification is accomplished by dissolving the product in dilute ethanolic alkali, removing any insoluble material by filtration and reacidifying with acetic acid to precipitate the product.

*Example 27.—Preparation of 2-cyclopropaneamidobenzimidazole-5-carboxamide*

This compound is prepared using the general procedure (Example 26), described by the above prepared ester substituting 3,4-diaminobenzamide (18.9 g., 0.125 mole) for methyl-3,4-diaminobenzoate.

*Example 28.—Preparation of 5-nitro-2-cyclopropaneamidobenzimidazole*

This compound is prepared according to the general procedure outlined above (Example 26), but using 4-nitro-o-phenylenediamine (19.1 g., 0.125 mole).

*Example 29.—Preparation of 5-amino-2-cyclopropaneamidobenzimidazole*

A solution of 5-nitro-2-cyclopropaneamidobenzimidazole in formic acid is hydrogenated over 5 percent palladium-on-carbon. When hydrogen uptake is complete, the solvent is removed in vacuo, the residue diluted with water, and the product collected after neutralization to pH 6.

The hydrochloride salt could be prepared by evaporating a solution of the free amino compound in dilute hydrochloric acid to dryness.

*Example 30.—Preparation of 5-dimethylamino-2-cyclopropaneamidobenzimidazole*

Following the general procedure outlined above (Example 26) for the preparation of methyl-2-cyclopropanebenzimidazole-5-carboxylate, but using 3,4-diamino-N,N-dimethylaniline (18.9 g., 0.125 mole), the desired product is obtained.

*Example 31.—Preparation of 5-acetamido-2-cyclopropaneamidobenzimidazole*

The hydrochloride salt (2.52 g., 0.01 mole) of 5-amino-2-cyclopropaneamidobenzimidazole (Example 29) is dissolved in water (50 ml.), sodium carbonate added (5.3 g., 0.05 mole), and the solution is treated dropwise with acetic anhydride (1.53 g., 0.015 mole). After stirring for a short period, the solution is neutralized with acetic acid and the precipitated product is collected.

2-B alcohol when referred to herein is 2 volume percent benzene plus 96% ethanol.

We claim:
1. The method of treating helminthiasis in animals comprising internally administering an effective amount in the range 5 to 500 mg./kg. of body weight daily of a compound of the formula:

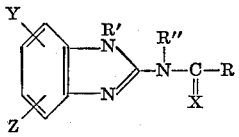

wherein
R is hydrogen, alkyl straight or branched containing 1 to 10 carbon atoms, alkenyl straight or branched containing 3 to 10 carbon atoms, alkynyl containing from 3 to 10 carbon atoms, cycloalkyl containing from 3 to 10 carbon atoms, alkylcycloalkyl containing from 4 to 10 carbon atoms, phenyl, naphthyl, phenyl substituted by lower alkyl, naphthyl substituted by lower alkyl, phenyl substituted by lower alkoxy, or naphthyl substituted by lower alkoxy, provided that when R is either alkenyl or alkynyl that the double or triple bond thereof is not conjugated with the C=X moiety;
R' is hydrogen, alkyl from 1 to 10 carbon atoms, or hydroxyalkyl;
R'' is hydrogen, alkyl from 1 to 10 carbon atoms, or acyl from 1 to 10 carbon atoms;
X is oxygen or sulfur; and
Y and Z are hydrogen, alkyl up to 10 carbon atoms, alkoxy up to 10 carbon atoms, trifluoromethyl, amino, alkylamino, dialkylamino, cyano, acylamino, halogen, hydroxy, nitro, alkylthio, carboxy, carbalkoxy, carboxamido, alklcarboxamido, or dialkylcarboxamido, with all the alkyl substituted moieties having up to four carbon atoms.

2. The method of treating helminthiasis in animals comprising internally administering an effective amount in the range 5 to 500 mg./kg. of body weight daily of a compound of the formula:

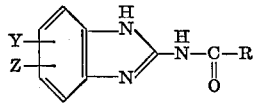

wherein
R is hydrogen, alkyl straight or branched from 1 to 10 carbon atoms, alkenyl straight or branched containing from 3 to 10 carbon atoms, alkynyl straight or branched containing 3 to 10 carbon atoms, cycloalkyl containing from 3 to 10 carbon atoms, alkylcycloalkyl containing from 4 to 10 carbon atoms, phenyl, naphthyl, phenyl substituted by lower alkyl, naphthyl substituted by lower alkyl, phenyl substituted by lower alkoxy, or naphthyl substituted by lower alkoxy, provided that when R is either alkenyl or alkynyl that the double or triple bond thereof is not conjugated with the C=O moiety; and
Y and Z are hydrogen, alkyl up to 10 carbon atoms, lower alkoxy up to 10 carbon atoms, trifluoromethyl, amino, alkylamino, dialkylamino, cyano, acylamino, halogen, hydroxy, nitro, alkylthio, carboxy, carbalkoxy, carboxamido, alkylcarboxamido, or dialkylcarboxamido, with all the alkyl substituted moieties having up to four carbon atoms.

3. A method according to claim 1 wherein said internally is orally.

4. A method according to claim 2 wherein Y and Z are hydrogen.

5. A method to claim 2 wherein said internally is orally.

6. A composition for anthelmintic activity in animals comprising an orally ingestible carrier and admixed therein an effective but non-toxic amount of an anthelmintic agent of the formula.

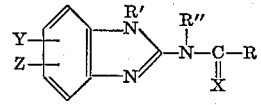

wherein
R is hydrogen, alkyl straight or branched containing 1 to 10 carbon atoms, alkenyl straight or branched containing 3 to 10 carbon atoms, alkynyl containing from 3 to 10 carbon atoms, cycloalkyl containing from 3 to 10 carbon atoms, alkylcycloalkyl containing from 4 to 10 carbon atoms, phenyl, naphthyl, phenyl substituted by lower alkyl, naphthyl substituted by lower alkyl, phenyl substituted by lower alkoxy, or naphthyl substituted by lower alkoxy, provided that when R is either alkenyl or alkynyl that the double or triple bond thereof is not conjugated with the C=X moiety;
R' is hydrogen, alkyl from one to ten carbon atoms, or hydroxyalkyl having 1 to 7 carbon atoms;
R'' is hydrogen, alkyl from 1 to 10 carbon atoms, or acyl from 1 to 10 carbon atoms;
X is oxygen or sulfur; and
Y and Z are hydrogen, alkyl up to 10 carbon atoms, alkoxy up to 10 carbon atoms, trifluoromethyl, amino, alkylamino, dialkylamino, cyano, acylamino, halogen, hydroxy, nitro, alkylthio, carboxy, carbalkoxy, carboxamido, alkylcarboxamido, or dialkylcarboxamido, with all the alkyl substituted moieties having up to four carbon atoms;
said composition being in the form of a capsule, tablet, bolus, packaged powder, or a liquid suspension wherein said suspension contains said anthelmintic agent and carrier dispersed in water.

7. A composition of claim 6 having therein as the anthelmintic agent 2-isobutyramidobenzimidazole.

8. A composition of claim 6 having therein as the anthelmintic agent 2-propionamidobenzimidazole.

9. A composition of claim 6 having therein as the anthelmintic agent 2-butyramidobenzimidazole.

10. A composition of claim 6 having therein as the anthelmintic agent 2-cyclopropanecarboxamidobenzimidazole.

11. A composition of claim 6 having therein as the anthelmintic agent 2-cyclobutanecarboxamidobenzimidazole.

References Cited

Chem. Abstracts, 54, p. 24678a (1960).

ALBERT T. MEYERS, *Primary Examiner.*

SAM ROSEN, *Examiner.*

ROCCO S. BARRESE, *Assistant Examiner.*